(12) United States Patent
Bergmann et al.

(10) Patent No.: US 10,144,398 B2
(45) Date of Patent: Dec. 4, 2018

(54) VEHICLE WITH AN ANTI-LOCK BRAKE SYSTEM AND A METHOD FOR BRAKING A VEHICLE

(75) Inventors: Dominik Bergmann, Sachsenkam (DE); Ludger Fiege, Grafing (DE); Gunter Freitag, München (DE); Matthias Gerlich, München (DE); Stefan Grieser-Schmitz, Koblenz (DE); Eugen Lanze, Urbar (DE); Ries Robison, Canton, MI (US)

(73) Assignee: Lucas Automotive GmbH, Koblenz (DE)

( * ) Notice: Subject to any disclaimer, the term of this patent is extended or adjusted under 35 U.S.C. 154(b) by 0 days.

(21) Appl. No.: 14/345,904

(22) PCT Filed: Aug. 16, 2012

(86) PCT No.: PCT/EP2012/066013
§ 371 (c)(1),
(2), (4) Date: Sep. 18, 2014

(87) PCT Pub. No.: WO2013/041311
PCT Pub. Date: Mar. 28, 2013

(65) Prior Publication Data
US 2015/0039166 A1    Feb. 5, 2015

(30) Foreign Application Priority Data

Sep. 20, 2011 (EP) ..................................... 11181972

(51) Int. Cl.
*B60T 8/176* (2006.01)
*B60T 8/1761* (2006.01)
(Continued)

(52) U.S. Cl.
CPC ................ *B60T 8/176* (2013.01); *B60L 7/26* (2013.01); *B60T 8/17616* (2013.01); *B60T 8/24* (2013.01);
(Continued)

(58) Field of Classification Search
CPC .... B60L 7/06; B60L 3/108; B60L 7/26; G06F 19/00; B60T 8/00; B60T 8/1755; B60T 8/176; B60T 8/17616
(Continued)

(56) References Cited

U.S. PATENT DOCUMENTS 5,492,192 A * 2/1996 Brooks .................. B60K 28/16
  180/165
5,632,534 A    5/1997 Knechtges
(Continued)

FOREIGN PATENT DOCUMENTS

CN    1827418 A     9/2006
DE    4435953 A1    5/1995
(Continued)

OTHER PUBLICATIONS

Japanese Office Action for Japanese Application No. 2014531155, dated Mar. 27, 2015 with English Translation.
(Continued)

*Primary Examiner* — Isaac G Smith
(74) *Attorney, Agent, or Firm* — MacMillan, Sobanski & Todd, LLC

(57) ABSTRACT

In order to achieve a vehicle wheel (10) slip relative to a roadway (12) while braking the vehicle, said slip being as advantageous as possible, the rotational speed (w) of the wheel (10) can be actively reduced by an ABS by means of a braking intervention and passively allowed to accelerate again via the roadway (12) when the brake is released. The slip of the wheel (10) oscillates by an optimal slip value
(Continued)

during the ABS regulating process. The aim of the invention is to improve an anti-lock braking system for a vehicle. In the method according to the invention, at least one wheel (10) of the vehicle is supplied with a braking torque (Mb) in order to temporarily reduce a travel speed (v) of the vehicle relative to a rolling surface (12), said braking torque acting against a rotating direction (14) of the wheel (10). Additionally, the wheel (10) is temporarily supplied with an acceleration torque (Ma) by means of an accelerating device of the vehicle during the reduction of the travel speed (v), said acceleration torque acting in the rotating direction (14).

20 Claims, 2 Drawing Sheets

(51) Int. Cl.
    *B60L 7/26*     (2006.01)
    *B60T 8/24*     (2006.01)
    *B60T 8/32*     (2006.01)

(52) U.S. Cl.
    CPC ......... *B60T 8/321* (2013.01); *B60T 2270/303* (2013.01); *B60T 2270/602* (2013.01); *B60T 2270/604* (2013.01); *B60T 2270/613* (2013.01); *Y02T 10/7258* (2013.01)

(58) Field of Classification Search
    USPC ...................................... 701/71, 84
    See application file for complete search history.

(56) References Cited

U.S. PATENT DOCUMENTS

| | | | |
|---|---|---|---|
| 5,853,229 | A | 12/1998 | Willmann et al. |
| 6,122,587 | A | 9/2000 | Takahara |
| 2002/0129985 | A1 | 9/2002 | Nissen et al. |
| 2005/0258685 | A1* | 11/2005 | Post, II .................. B60K 28/16 303/139 |
| 2006/0196712 | A1 | 9/2006 | Toyota et al. |
| 2007/0038340 | A1 | 2/2007 | Sekiguchi et al. |
| 2007/0152499 | A1* | 7/2007 | Tonoli .................. B60K 17/356 303/20 |
| 2010/0065386 | A1* | 3/2010 | Bourqui .................... B60L 7/06 188/159 |
| 2010/0113215 | A1 | 5/2010 | Jager et al. |
| 2010/0250083 | A1* | 9/2010 | Takahashi ............. B60T 8/1755 701/70 |
| 2010/0292882 | A1* | 11/2010 | Murata ..................... B60L 7/18 701/22 |
| 2011/0316322 | A1 | 12/2011 | Abiko et al. |
| 2015/0039166 | A1 | 2/2015 | Bergmann et al. |

FOREIGN PATENT DOCUMENTS

| | | | | |
|---|---|---|---|---|
| DE | 19604134 | A1 | 8/1997 | |
| EP | 1698507 | A1 | 9/2006 | |
| EP | 1935737 | A1 * | 6/2008 | ......... B60K 23/0808 |
| EP | 1935737 | A1 | 6/2008 | |
| EP | 2236376 | A1 | 10/2010 | |
| JP | H11189067 | A | 7/1999 | |
| JP | 2001263148 | A | 9/2001 | |
| JP | 2005051889 | A | 2/2005 | |
| JP | 2006025485 | A | 1/2006 | |
| JP | 2006333548 | A | 12/2006 | |
| JP | 2007049825 | A | 2/2007 | |
| WO | WO2006114977 | A1 | 11/2006 | |
| WO | WO2010110027 | A1 | 9/2010 | |

OTHER PUBLICATIONS

Chinese Office Action for Chinese Patent Application No. 201280057042.8, dated Sep. 25, 2015 with English Translation.
European Office Action for European Application No. 11 181 972.8, dated May 6, 2016, with English Translation.
European Search Report in corresponding European Patent Application No. 11181972.8 dated Feb. 16, 2012, with English translation.
International Preliminary Examination Report in corresponding PCT Application No. PCT/EP2012/066013 dated Jan. 9, 2014, with English translation.
International Search Report and Written Opinion in corresponding PCT Application No. PCT/EP2012/066013 dated Nov. 26, 2012, with English translation.

* cited by examiner

VEHICLE WITH AN ANTI-LOCK BRAKE SYSTEM AND A METHOD FOR BRAKING A VEHICLE

The present patent document is a § 371 nationalization of PCT Application Serial Number PCT/EP2012/066013, filed Aug. 16, 2012, designating the United States, which is hereby incorporated by reference. This patent document also claims the benefit of EP 11181972.8, filed on Sep. 20, 2011, which is also hereby incorporated by reference.

BACKGROUND

The present embodiments relate to a vehicle having a brake device for braking the vehicle and a method for braking the vehicle.

A vehicle may be a motor vehicle, a rail vehicle or an aircraft. An anti-lock brake system for at least one of the wheels of the vehicle is provided.

If a vehicle (e.g., a motor vehicle) rolls over a rolling surface of a carriageway, a force that acts parallel to the rolling surface may, over a wheel of the vehicle, be at maximum as large as the static friction acting between a tread of a tire of the wheel and the rolling surface of the roadway. This force that may be transmitted parallel to the rolling surface is divided into the driving force or braking force, and the lateral guiding force.

If the vehicle is braked strongly such that the maximum braking force that may be transmitted to the rolling surface is exceeded, the wheel locks and slides or skids over the rolling surface. In order to restore grip between the tread of the tire and the rolling surface of the roadway, the tread of the tire is to be accelerated again to such an extent that a relative speed with respect to the rolling surface is small enough to permit the grip again. For this purpose, in a vehicle with a hydraulic friction brake, the friction brake may be temporarily released by using an anti-lock brake system. The anti-lock brake system engages for this purpose in the hydraulic brake circuit via solenoid valves. In order to detect the need for intervention, the rotational speed of the wheel is measured. As soon as the rotational speed of the wheel drops too strongly compared to the velocity, the friction brake is released. As a result, the friction brake no longer applies any braking torque to the wheel. The wheel that slides over the rolling surface is subsequently made to roll again by the friction force acting between the wheel and the roadway and is accelerated. When the rotational speed of the wheel corresponds to the rotational speed of the other wheels again, a braking torque may be applied to the wheel again by the friction brake.

An anti-lock brake system (ABS) may not wait until a wheel locks to intervene. Instead, when a wheel is still rolling, the slip thereof with respect to the roadway is already controlled. This will be explained in more detail below with reference to FIG. 1. The braking force F that acts on a wheel of a vehicle that is rolling straight ahead firstly increases, starting from a free rolling wheel with a slip S=0% during the braking of the vehicle (and in a comparable way also during the acceleration thereof), with increasing slip S, up to a maximum value in order approximately to become lower again starting from a slip value of S=30%. In order to obtain the most favorable slip during the braking of the vehicle, the rotational speed of the wheel is alternately actively reduced using a braking intervention by the ABS and accelerated again passively over the roadway when the brake is released. As a result, the slip is controlled within a range of, for example, S=8% to S=35%. During the ABS control, the rotational speed of the wheel oscillates, for example, between corresponding rotational speed values.

DE 44 35 953 A1 discloses generating, for the purpose of braking a passenger car, a total braking torque that is composed of the braking torque of a hydraulic brake system and the braking torque of an electric motor operated in the regenerative region.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an anti-lock brake system for a vehicle is improved.

In the method according to one or more of the present embodiments, in order to reduce the velocity that the vehicle has with respect to a rolling surface, a braking torque is also temporarily applied to at least one wheel of the vehicle. The braking torque acts counter to a rotational direction of the wheel. In addition, there is provision that during the reduction in the velocity, an acceleration torque is temporarily applied to the wheel using an acceleration device of the vehicle. The acceleration torque acts in the rotational direction. The vehicle is, for example, a passenger car or truck.

The method according one or more of the present embodiments provides the advantage that there is now no longer dependence on the wheel alone being accelerated by the frictional force acting on the wheel by the roadway if slip is too large. If the wheel is braked too strongly or if a surface property of the rolling surface along the braking distance changes, and this results in a reduced static friction, the slip of the wheel is also actively adapted during the braking by the acceleration device.

The vehicle according to one or more of the present embodiments may advantageously be braked according to the method. For this purpose, the vehicle according one or more of the present embodiments has a brake device for braking the vehicle. This brake device is configured to apply a braking torque to at least one wheel of the vehicle. An acceleration device that is configured to apply an acceleration torque to the wheel is provided. Using a control device of the vehicle, the vehicle may be braked by the brake device and the acceleration device according to one embodiment of the method.

The braking torque and the acceleration torque are each, for example, a resulting torque that acts in total on the wheel. In order to be able to change over between a braking torque and an acceleration torque, for example, a driving torque may be applied to the wheel by an internal combustion engine of the vehicle. At the same time, a friction torque that counteracts the driving torque is applied by a friction brake. By balancing out these two torques, either a braking torque or an acceleration torque may be generated as a resulting torque.

In one embodiment, the acceleration device includes at least one electric machine With the at least one electric machine, an acceleration torque may be made available within a particularly short time period. The electric machine is, according to one embodiment of the vehicle, a wheel hub motor or wheel hub drive of the wheel. This permits play-free coupling to the wheel, with the result that a comparatively low wear of the arrangement results from frequent changing over between a braking torque and an acceleration torque.

With respect to the acceleration torque, one embodiment of the method provides reducing, by the acceleration torque, to an absolute value of a slip that the wheel has with respect to the rolling surface. In other words, an excessively slow or locked wheel is brought back into a range of a more favorable slip without accelerating the vehicle overall (e.g., increasing the velocity) in the process. Acceleration is carried out only until a desired relatively low slip value is reached.

According to another embodiment of the method, when cornering of the vehicle is detected by the acceleration torque, an absolute value of a lateral guiding force acting between the wheel and the rolling surface is increased. As a result, veering out of the vehicle may be advantageously prevented. The setting of a desired lateral guiding force may be carried out, for example, in accordance with the relationships described by the Kamm circle.

The brake device of the vehicle according to one or more of the present embodiments includes a friction brake. With such a friction brake, a particularly high braking power may be made available. According to one development of the method, there is provision that at at least one time, only part of the absolute value of the braking torque is generated by a friction brake. This provides the advantage that the setting of the final braking torque may be set by a more precisely and more quickly controllable device (e.g., an electric machine) In this context, the electric machine then does not have to be able to apply the full braking power. As a result, the manufacturing costs of the more precisely and more quickly controllable device may be kept low.

In addition to or as an alternative to a friction brake, in the vehicle, the brake device may include at least one electric machine. As already mentioned, with such a machine, more precise and faster setting of the braking torque may be provided. In addition, a recuperative braking mode in which kinetic energy of the vehicle is converted into useable electrical energy may be provided.

According to one development of the method, changing over occurs between applying the braking torque to the wheel and applying the driving torque to the wheel based on a controller. As a result, the wheel may be held more precisely at a desired optimum slip point. In this context, a PID controller has proven advantageous. With such a controller, the slip may be set (e.g., in conjunction with an electric machine as an acceleration device) to a single optimum setpoint value during the duration of the braking process without a significant deviation.

In one embodiment of the vehicle, the control device includes two control circuits. One of the two control circuits forms an outer control circuit, and the other of the two control circuits forms an inner control circuit. The two control circuits are operable for adjusting the resulting torque that acts on the wheel. This embodiment makes it possible to combine a conventional ABS with a control method that constitutes an embodiment of the method. If an electric machine is used as the acceleration device, a (relatively slow) control circuit of the conventional ABS may form the outer control circuit, and a (comparatively faster) control circuit for the electric machine may form the inner control circuit. As a result, a retrofittable brake system may be made available.

In order to be able to determine a rotational speed of the wheel precisely, one development of the vehicle provides a rotational speed measuring device that is configured to determine a rotational speed of the wheel based on a signal of a resolver of an electric machine.

DETAILED DESCRIPTION

Figure 2:
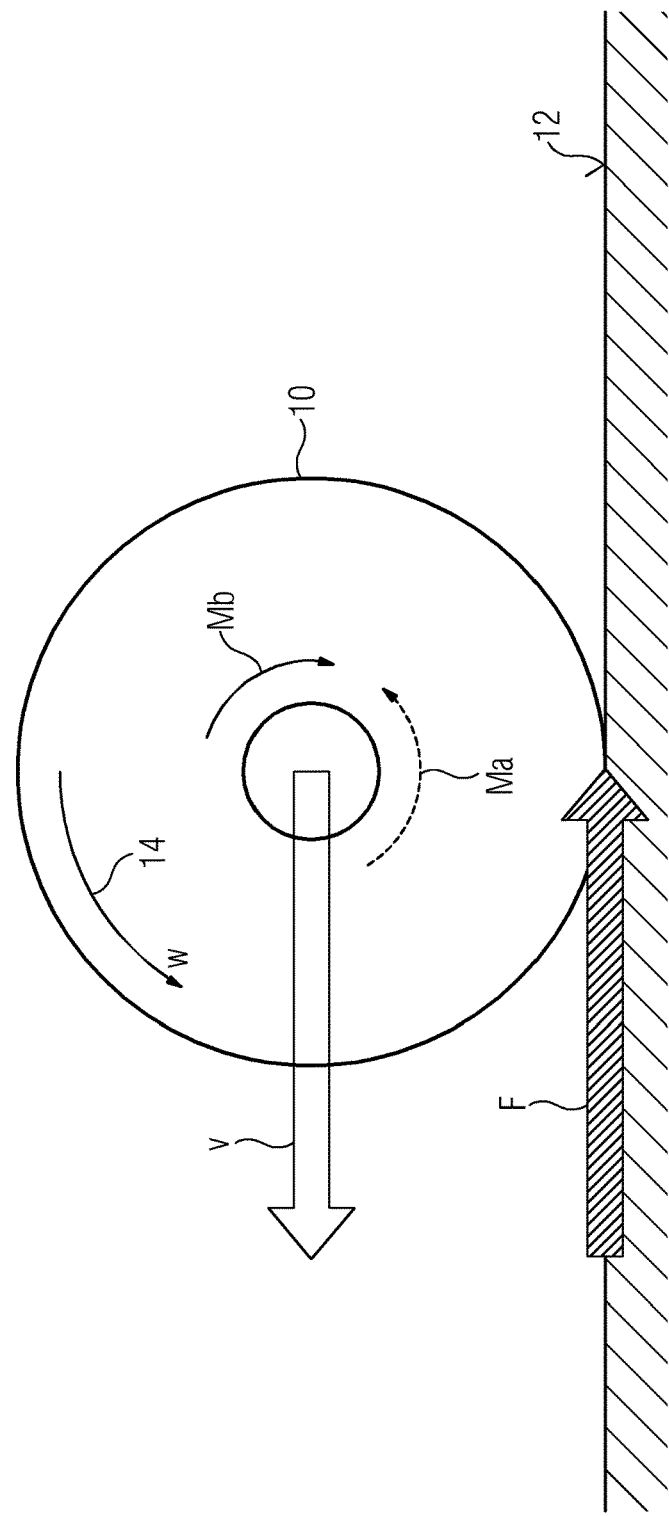
FIG. 2 is a schematic illustration of a wheel of a passenger car that illustrates an embodiment of a vehicle.

FIG. 2 shows a wheel 10 that rolls over a road 12. The wheel 10 belongs to a passenger car (not illustrated further) that moves with a velocity v on the road 12. The wheel 10 is coupled to an electric wheel hub drive (not illustrated) that has an electric machine (e.g., a synchronous machine or an asynchronous machine) The passenger car may be both accelerated and braked using the electric wheel hub drive.

For the following description, it is assumed that a driver of the passenger car is currently carrying out full braking. The passenger car is rolling straight ahead in the process.

Figure 1:
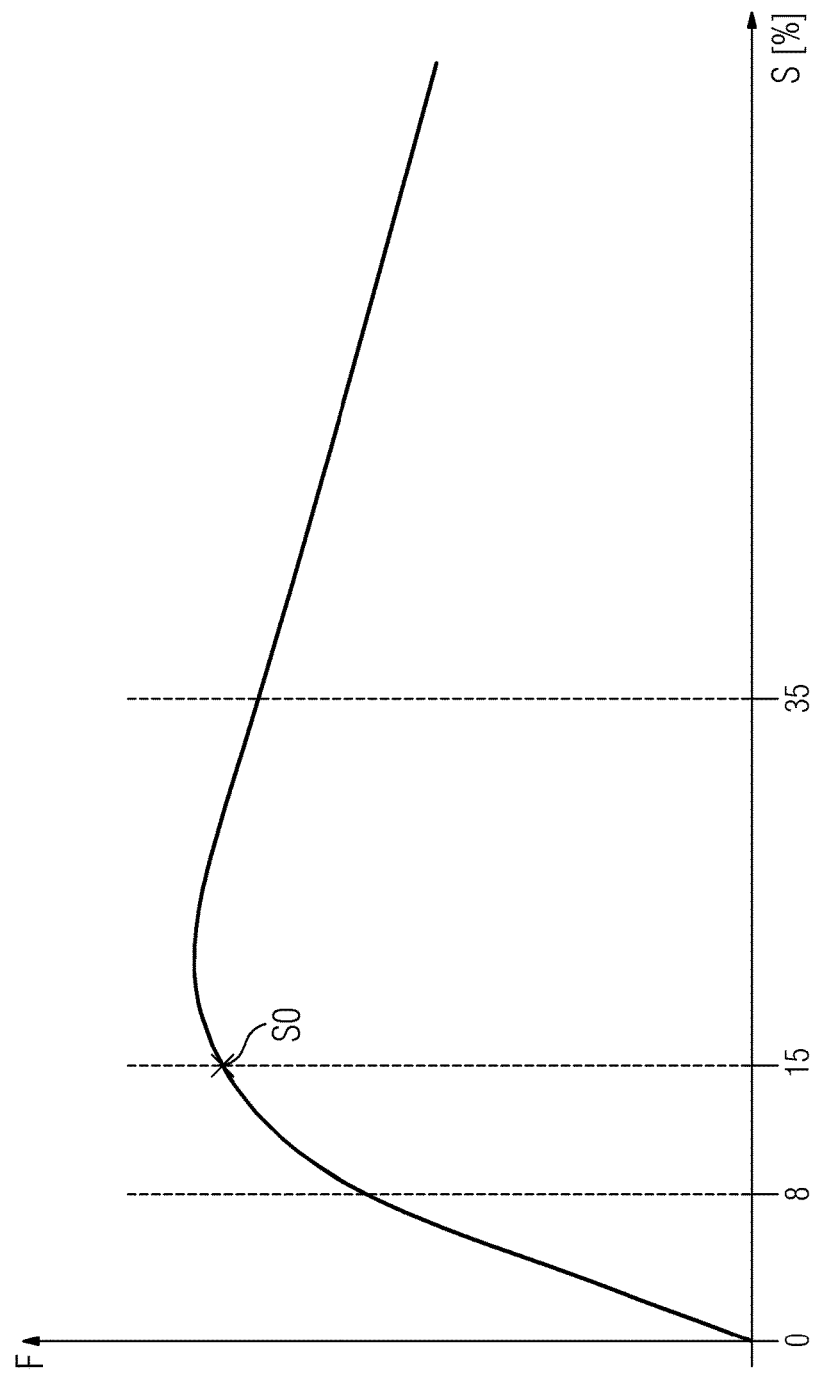
FIG. 1 shows a diagram with a graph illustrating a basic relationship between a slip of a wheel and a braking force acting on the wheel.

In response to an activation of a brake pedal of the passenger car, the wheel hub drive generates a braking torque Mb that acts on the wheel 10 counter to a rotational direction 14 of the wheel 10. In order to generate the braking torque Mb, a control device of the wheel hub drive transmits control signals to power switches of an alternator of the electric machine. The power switches subsequently set winding currents in a stator of the electric machine such that in the electric machine, a magnetic rotary field applies the braking torque Mb to a rotor of the electric machine that is mechanically coupled to the wheel 10. Owing to the braking torque Mb acting on the wheel, a rotational speed w of the wheel 10 is reduced. This increases a slip S (see FIG. 1) of the wheel 10 with respect to the road 12, and a braking force F acts on the wheel 10 from the road 12. As a result, the velocity v of the passenger car is ultimately reduced.

The wheel hub drive constitutes a highly dynamically controllable drive. The control device of the wheel hub drive sets the slip S of the wheel 10 to a setpoint value S0=15%. This setpoint value S0 constitutes an optimum value at which the braking force F has a maximum value if a small predetermined force reserve is still to be kept available for a slip S>15%. The wheel 10 in this context, in the event of excessively strong braking (S>15%) or sliding of the wheel 10 over the road 12, may also be accelerated actively using an electric motor even during the braking in order to set the slip S to the setpoint value S0 again. In this example, the rotary field of the electric machine is simply reset within less than 5 ms by correspondingly actuating the power switches, such that the electric machine applies an acceleration torque Ma, acting in the rotational direction 14, to the wheel 10. In this way, the rotational speed w of the wheel 10 is set again to an optimum value at which the setpoint value S0 for the slip is obtained. This results in a time advantage in comparison to a conventional ABS that, in the event of excessively strong braking of a wheel, is to rely on passive acceleration of the wheel using the frictional force that acts between the roadway and the wheel.

In addition, in the case of the passenger car in the example, vehicle movement dynamics stability of the vehicle is increased since the control loop of the control unit with the direct intervention acting on the rotor is faster than a control loop of an ABS, by which a hydraulic system of a friction brake is controlled.

Electric machines may have a resolver that resolves the rotational speed better than a rotational speed sensor as is used in a conventional ABS. Owing to the mechanical coupling between the electric machine and the wheel, such a revolver may also be used to determine the rotational speed of the wheel. In one embodiment, a separate rotational speed sensor may be used for measuring the rotational speed of the wheel.

As is shown in the example, when electric machines are used, the braking may also be carried out by electric motor (e.g., not by a friction brake). In this case, a control algorithm of the control unit controls both the reduction in speed and the acceleration of the wheel. As a result, a jitter (e.g., oscillating about the optimum slip value) may be reduced. The wheel is held at the braking force maximum. The reference variable "rotational speed w of the wheel" may be controlled better. During the braking, the wheel is at the optimum slip point for longer than a conventional ABS.

The latter principle may also be used in combination with a friction brake. For this purpose, only part of the braking force is set at the friction brake. The adjustment is then carried out by controlling the electric-motor-operated brake. The sum of the braking force from the friction brake and the electric-motor-operated brake results in the braking force that is necessary to keep the wheel at the braking force maximum.

The re-acceleration phase of a locked wheel or of a wheel that is too slow compared to the vehicle speed may be shortened by the active intervention by the electric drive. It is no longer necessary to rely on the wheel's own acceleration, which depends on the coefficient of friction of the underlying surface. The wheel is therefore held better at the point of optimum slip. As a result, the braking distance may be shortened, the wear of the tire of the wheel may be reduced, and the stability may be increased.

The external wheel rotational speed sensor may be dispensed with if the resolver sensor, present in the electric machine, is used to acquire the rotational speed information.

This eliminates the costs for the rotational speed sensor, the mounting, the cabling and the associated evaluation circuit.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for braking a vehicle that rolls with at least one wheel over a rolling surface, the method comprising:
   reducing a velocity of the vehicle with respect to the rolling surface;
   temporarily applying, by a braking device, a braking torque to the at least one wheel, the braking torque acting counter to a rotational direction of the at least one wheel;
   adjusting a slip that the at least one wheel has with respect to the rolling surface to a predetermined setpoint value, the adjusting comprising temporarily applying, by an acceleration device of the vehicle, an acceleration torque to the at least one wheel during the temporary application of the braking torque to the at least one wheel, the acceleration torque acting in the rotational direction;
   detecting cornering of the vehicle; and
   increasing, by the acceleration torque, an absolute value of a lateral guiding force acting between the at least one wheel and the rolling surface,
   wherein the application of the braking torque and the acceleration torque causes a resulting torque that acts in total on the at least one wheel,
   wherein the braking device is controlled by a first control circuit which is configured to automatically apply the braking device in an alternatingly active fashion to adjust the slip of the at least one wheel;
   wherein the acceleration device is controlled by a second electronic control circuit which is configured to automatically apply the acceleration device of the vehicle to adjust the resulting torque that acts in total on the at least one wheel;
   wherein the first control circuit and the second control circuit are operable to change the resulting torque between a resulting braking torque and a resulting acceleration torque, in order to adjust the slip that that at least one wheel has with respect to the rolling surface to the predetermined setpoint value.

2. The method of claim 1, wherein the acceleration torque reduces an absolute value of a slip that the at least one wheel has with respect to the rolling surface.

3. The method of claim 1, further comprising generating, using a friction brake at at least one time, at least part of the absolute value of the braking torque.

4. The method of claim 1, further comprising generating, using an electric machine at at least one time, at least part of the absolute value of the braking torque or of the acceleration torque.

5. The method of claim 1, further comprising measuring, using a resolver of an electric machine, a rotational speed of the at least one wheel.

6. A vehicle comprising:
   a brake device operable for braking the vehicle, the brake device being configured to apply a braking torque to at least one wheel of the vehicle;
   an acceleration device configured to apply an acceleration torque to the at least one wheel, wherein the acceleration device is also configured to increase, by the acceleration torque in response to detecting cornering of the vehicle, an absolute valve of a lateral guiding force acting between the at least one wheel and a rolling surface; and
   a control device configured to brake the vehicle using the brake device and the acceleration device, the braking of the vehicle comprising:
   reduction of a velocity of the vehicle with respect to a rolling surface, over which the at least one wheel rolls;
   temporary application of the braking torque to the at least one wheel, the braking torque acting counter to a rotational direction of the at least one wheel; and temporary application, by the acceleration device, of the acceleration torque to the at least one wheel during the temporary application of the braking torque to the at least one wheel, such that a slip that the at least one wheel has with respect to the rolling surface is adjusted to a predetermined setpoint value, the acceleration torque acting in the rotational direction, wherein the application of the braking torque and the acceleration torque causes a resulting torque that acts in total on the at least one wheel, wherein the braking device is controlled by a first control circuit which is configured to automatically apply the braking device in an alternatingly active fashion to adjust the slip of the at least one wheel;

wherein the acceleration device is controlled by a second electronic control circuit which is configured to automatically apply the acceleration device of the vehicle to adjust the resulting torque that acts in total on the at least one wheel;

wherein the first control circuit and the second control circuit are operable to change the resulting torque between a resulting braking torque and a resulting acceleration torque, in order to adjust the slip that the at least one wheel has with respect to the rolling surface to the predetermined setpoint value.

7. The vehicle of claim 6, wherein the acceleration device comprises at least one electric machine.

8. The vehicle of claim 6, wherein the brake device comprises a friction brake.

9. The vehicle of claim 6, wherein the brake device comprises at least one electric machine.

10. The vehicle of claim 6, further comprising a rotational speed measuring device configured to determine a rotational speed of the at least one wheel based on a signal of a resolver of an electric machine.

11. The vehicle of claim 7, wherein the at least one electric machine comprises at least one electric wheel hub drive.

12. The vehicle of claim 9, wherein the at least one electric machine comprises at least one electric wheel hub drive.

13. A method for braking a vehicle that rolls with at least one wheel over a rolling surface, the method comprising:
reducing a velocity of the vehicle with respect to the rolling surface;
temporarily applying, by a braking device, a braking torque to the at least one wheel, the braking torque acting counter to a rotational direction of the at least one wheel;
adjusting a slip that the at least one wheel has with respect to the rolling surface to a predetermined setpoint value, the adjusting comprising temporarily applying, by an acceleration device of the vehicle, an acceleration torque to the at least one wheel during the temporary application of the braking torque to the at least one wheel, the acceleration torque acting in the rotational direction;

wherein the braking device is controlled by a first control circuit which is configured to automatically apply the braking device in an alternatingly active fashion to adjust the slip of the at least one wheel;

wherein the acceleration device is controlled by a second electronic control circuit which is configured to automatically apply the acceleration device of the vehicle to adjust a resulting torque that acts in total on the at least one wheel;

wherein the first control circuit and the second control circuit are operable to change the resulting torque between a resulting braking torque and a resulting acceleration torque, in order to adjust the slip that that at least one wheel has with respect to the rolling surface to the predetermined setpoint value.

14. The method of claim 13, wherein the acceleration torque reduces an absolute value of a slip that the at least one wheel has with respect to the rolling surface.

15. The method of claim 13, further comprising generating, using a friction brake at at least one time, at least part of the absolute value of the braking torque.

16. The method of claim 13, further comprising generating, using an electric machine at at least one time, at least part of the absolute value of the braking torque or of the acceleration torque.

17. The method of claim 13, further comprising measuring, using a resolver of an electric machine, a rotational speed of the at least one wheel.

18. The method of claim 13, wherein the second control circuit is faster compared to the first control circuit.

19. The method of claim 1, wherein the second control circuit is faster compared to the first control circuit.

20. The vehicle of claim 6, wherein the second control circuit is faster compared to the first control circuit.

* * * * *